(12) United States Patent
Couleur et al.

(10) Patent No.: US 10,804,803 B1
(45) Date of Patent: Oct. 13, 2020

(54) COMBINED BUCK-BOOST CONVERTER USING A SINGLE INDUCTOR

(71) Applicant: Apple Inc., Cupertino, CA (US)

(72) Inventors: Michael Couleur, Munich (DE); Nicola Rasera, Munich (DE); Siarhei Meliukh, Munich (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/661,913

(22) Filed: Oct. 23, 2019

(51) Int. Cl.
*H02M 3/158* (2006.01)
*H02M 3/156* (2006.01)

(52) U.S. Cl.
CPC ........ *H02M 3/1584* (2013.01); *H02M 3/1582* (2013.01); *H02M 2003/1566* (2013.01); *H02M 2003/1586* (2013.01)

(58) Field of Classification Search
CPC .. H02M 3/158; H02M 3/1582; H02M 3/1584; H02M 2003/1566; H02M 2003/1586
See application file for complete search history.

(56) References Cited

U.S. PATENT DOCUMENTS

| | | | | |
|---|---|---|---|---|
| 7,952,900 B2 * | 5/2011 | Tomiyoshi | .......... | H02M 3/1582 363/132 |
| 8,305,061 B1 * | 11/2012 | Zhang | ................ | H02M 3/1582 323/259 |
| 9,479,052 B2 | 10/2016 | Branca | | |
| 9,680,323 B2 | 6/2017 | Ramorini et al. | | |
| 10,164,534 B2 | 12/2018 | Hang et al. | | |
| 2013/0278232 A1 * | 10/2013 | Herbison | ................... | G05F 1/62 323/234 |
| 2013/0334987 A1 * | 12/2013 | Garg | ..................... | H01L 41/042 318/116 |
| 2014/0084883 A1 * | 3/2014 | Tanabe | ................ | H02M 3/1582 323/271 |
| 2017/0141603 A1 | 5/2017 | King et al. | | |

\* cited by examiner

*Primary Examiner* — Matthew V Nguyen
(74) *Attorney, Agent, or Firm* — Kowert, Hood, Munyon, Rankin & Goetzel, P.C.; Erik A. Heter

(57) ABSTRACT

A DC-DC converter that provides both buck and boost voltages using a single inductor is disclosed. The DC-DC converter includes an H-bridge circuit having an inductor having first and second terminals, and a number of switches. The switches include a first switch coupled between the second inductor terminal and a boost voltage node, a second switch coupled between the second inductor terminal and a buck voltage node, and a third switch coupled between the first inductor terminal and an input voltage node. A control circuit is coupled to activate the switches in accordance with a number of different phases such that a buck voltage (e.g., less than the input voltage) is provided on the buck voltage node, while a boost voltage (e.g., greater than the input voltage) is provided on the boost voltage node.

20 Claims, 9 Drawing Sheets

COMBINED BUCK-BOOST CONVERTER USING A SINGLE INDUCTOR

BACKGROUND

Technical Field

This disclosure is directed to electronic circuits, and more particularly, to DC-DC converters.

Description of the Related Art

Voltage regulators are commonly used in a wide variety of circuits in order to provide a desired voltage to particular circuits. To this end, a wide variety of voltage regulator circuits are available to suit various applications. Linear voltage regulators are used in a number of different applications in which the available supply voltages exceed an appropriate value for the circuitry to be powered. Another type of voltage regulator is a switched-mode voltage regulator, more commonly referred to a switching power supply, or alternatively, a DC-DC converter. Switching power supplies can be subdivided into two categories, buck converters and boost converters. A buck converter, from its supply to its load, steps down an input voltage, while stepping up current. A boost converter, from its supply to its load, steps up the input voltage while stepping down the current.

A basic switching power supply includes a switch and an energy storage element (such as an inductor). Operation in a basic switching power supply includes an on state (when the switch is closed) and an off state (when the switch is open). During the on state, the energy storage element begins to store energy. For example, when the energy storage element is an inductor, current increases and responsive thereto, the inductor produces an opposing voltage across its terminals. During the off state, the switch is open and the inductor becomes a current source. Over time, the changing voltage of the switching power supply is averaged out to a substantially DC voltage.

Many electronic systems include a wide variety of circuits having differing voltage requirements. For portable systems, a battery is typically provided as a primary voltage source. Some of the circuits within a portable system may operate on voltages that are less than the battery voltage, while others may operate on voltages that are greater than that of the battery. Accordingly, many portable systems include both at least one buck converter and at least one boost converter.

SUMMARY

A DC-DC converter that provides both buck and boost voltages using a single inductor is disclosed. In one embodiment, the DC-DC converter includes an H-bridge circuit having an inductor having first and second terminals, and a number of switches. The switches include a first switch coupled between the second inductor terminal and a boost voltage node, a second switch coupled between the second inductor terminal and a buck voltage node, and a third switch coupled between the first inductor terminal and an input voltage node. A control circuit is coupled to activate the switches in accordance with a number of different phases such that a buck voltage (e.g., less than the input voltage) is provided on the buck voltage node, while a boost voltage (e.g., greater than the input voltage) is provided on the boost voltage node.

In one embodiment, the control circuit may activate and deactivate the switches in accordance with the different phases, while cycling the switches through the phases in a repetitive manner. A first phase may include a buck charging current passing through the inductor, while a second phase (following the first phase) may include a boost charging current passing through the inductor. A third phase (following the second phase) may include a boost discharge current passing through the inductor, while a fourth phase (following the third phase) may include a buck discharge current passing through the inductor. Upon completion of the fourth phase, the cycle begins again with the first phase. The resulting outputs on the buck and boost nodes are substantially buck and boost DC voltages.

The control circuit may utilize first and second feedback voltages generated based on the buck and boost voltages, respectively. Two different control loops may be implemented, with a first loop being based on an average of the buck and boost voltages, with a second loop based on a differential between the two. Signals corresponding to sense current may also be provided to the control circuit. Based on the feedback voltages and the sense current, the geometric points of the current pulse through the inductor are determined by the control circuit, with the various switches activated and deactivated accordingly.

BRIEF DESCRIPTION OF THE DRAWINGS

The following detailed description makes reference to the accompanying drawings, which are now briefly described.

Figure 1:
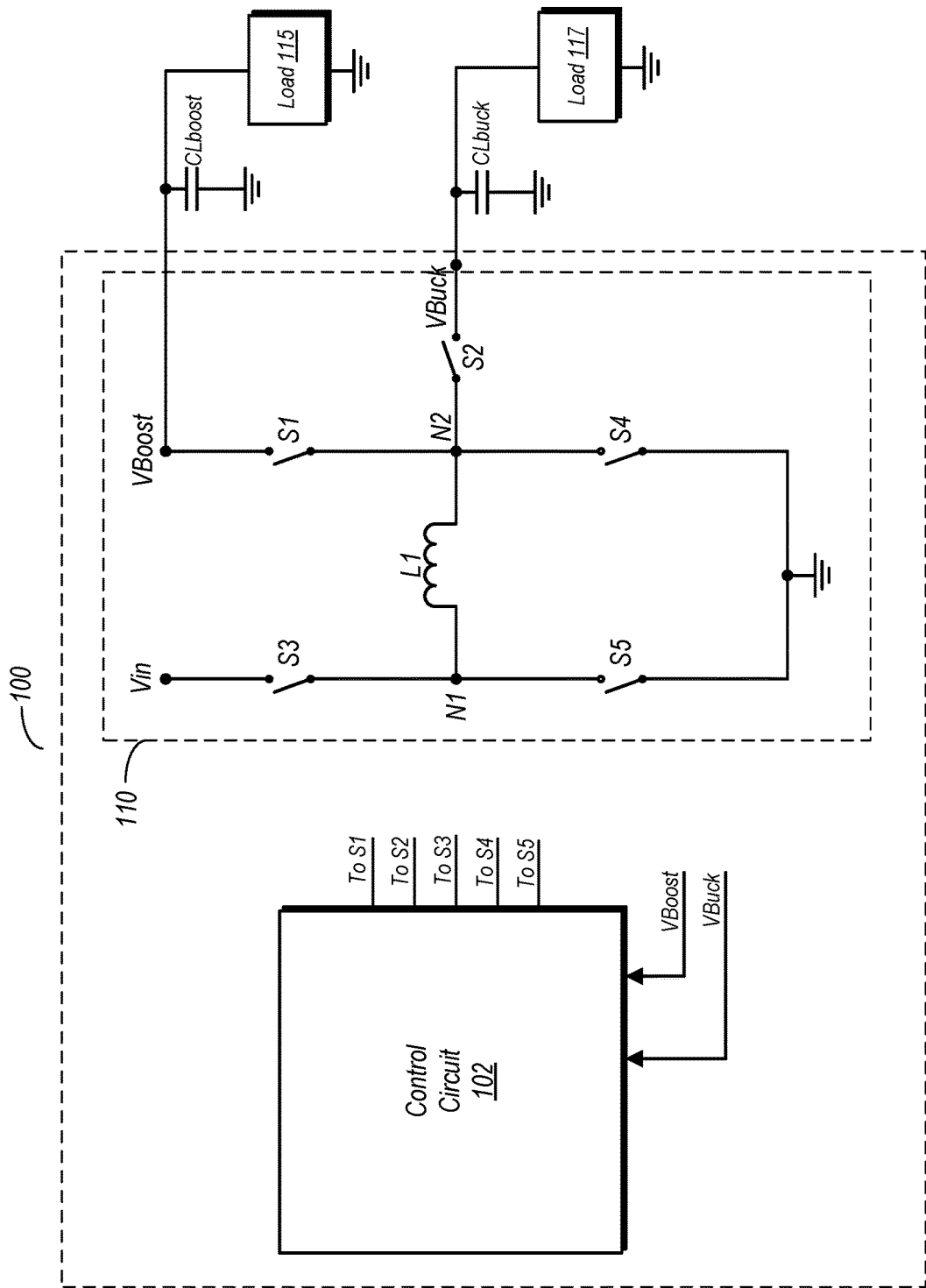
FIG. 1 is a diagram of one embodiment of a DC-DC converter with buck and boost outputs.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components. etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION OF EMBODIMENTS

The present disclosure is directed to a DC-DC converter which utilizes a single inductor and produces both a buck voltage (less than an input voltage) and a boost voltage (greater than the input voltage). Accordingly, the DC-DC converter disclosed herein is effectively two DC-DC converters, one boost and one buck, combined into a single circuit.

The DC-DC converter of the present disclosure includes an H-bridge circuit having an inductor and a number of switches. A first switch, when closed, couples a boost voltage output node to a terminal of the inductor. A second switch, when closed, coupled a buck voltage output node to the same terminal of the inductor. A third switch, when closed, couples an input voltage node to the opposite terminal of the inductor. Fourth and fifth switches are also coupled between each of the inductor terminals and a ground node.

A control circuit is coupled to the H-bridge circuit, and controls the operation of each of the switches. In one embodiment, the control circuit includes a state machine that cycles operation of the H-bridge circuit through four different phases. These phases are, in order, a buck charging phase, a boost charging phase, a boost discharging phase, and buck discharging phase. As this cycle of phases is repeated, the DC-DC converter produces substantially DC voltages on both the buck and boost output voltage nodes.

The control circuit may cycle the H-bridge circuit through the phases based on different control loops. A first control loop may control an average of the two output voltages by adjusting a valley, or minimum level. A second control loop may control a differential error between the two output voltages by adjusting a buck-to-boost level (e.g., a difference between the buck and boost voltages). Additional voltages (e.g., a reference voltage, voltages corresponding to sensed inductor currents, etc.) may also be utilized by the control circuit. Based on these various signals and corresponding thresholds, the control circuit may step the H-bridge circuit through each of the phases. Various embodiments of a DC-DC converter operating in accordance with the disclosure are now discussed in further detail, beginning with FIG. 1.

FIG. 1 illustrates one embodiment of a DC-DC converter having buck and boost outputs and utilizing a single inductor. In the embodiment shown, DC-DC converter includes a control circuit 102 and an H-bridge circuit 110. The example shown here is configured to provide two supply voltages to two correspondingly coupled loads. Load circuit 115 is coupled to receive a boost voltage, VBoost, which is greater than the input voltage, Vin. A load capacitance, CLBoost is also coupled to the VBoost node. Load 117 is coupled to receive a buck voltage, VBuck. A load capacitance CLBuck is also coupled to the VBuck node. A DC input voltage may be provided on the input node, Vin, and thus provides the voltage from which VBoost and VBuck are generated.

H-bridge circuit 110 in the embodiment shown includes an inductor L1 coupled between nodes N1 and N2, and a number of switches, S1-S5. It is important to note that the single inductor L1 is used in the generation of both the boost and buck voltages that are output from DC-DC converter 100. The switches S1-S5 may be MOSFETs, bipolar transistors, or any other suitable type of switching device. Switch S1 is coupled between one of the terminals of L1 and VBoost. Switch S2 is coupled between the same one of the inductor terminals and VBuck. Switch S3 is coupled between the input voltage node, Vin, and the opposite terminal of inductor L1. Switches S4 and S5 are each coupled between a ground node and one of the inductor terminals as shown.

Control circuit 102 in the embodiment shown may selectively close and open the switches S1-S5 in order to generate the boost and buck voltages. Accordingly, control circuit 102 in the embodiment shown provides separate control signals for each of the switches of H-bridge circuit 110. Control circuit 102 is further coupled to receive both the boost and buck voltages, VBoost and VBuck, respectively as feedback from H-bridge circuit 110. Although not explicitly shown here, one or more comparators may be coupled across switches within H-bridge circuit 110 to provide signals indicative of sensed currents. For example, in one embodiment, a first comparator may be coupled across S3 (inputs on Vin and N1), a second comparator may be coupled across S1 (inputs on VBoost and N2), and a third comparator may be coupled across S5 (inputs on N1 and ground). Each of these comparators may measure a differential voltage across the respective switch when that switch is closed, generating a corresponding output voltage signal indicative of the current through that switch. In one embodiment, these signals may be provided to a multiplexer, which may output the signal Isense to comparators within control circuit 102, with the correct input signal being selected to provide the Isense output signal. These output voltage signals, along with the voltages received from VBoost and VBuck may be utilized by control circuit 102 to determine when to open and close various ones of the switches.

In the embodiment shown, control circuit 102 may cause H-bridge circuit 110 to operate in a cycle. Each of the cycles may span over a current pulse through inductor L1, and may be divided into the four distinct phases discussed above. In terms of the H-bridge circuit 110, each phase may be defined by which of the switches are opened and which are closed. These points at which control circuit 102 changes the switch configuration for one phase to another may be determined based on the various quantities fed back thereto, as described in the previous paragraph. Additional details of control circuit 102 will now be discussed in reference to FIG. 2.

Figure 2:
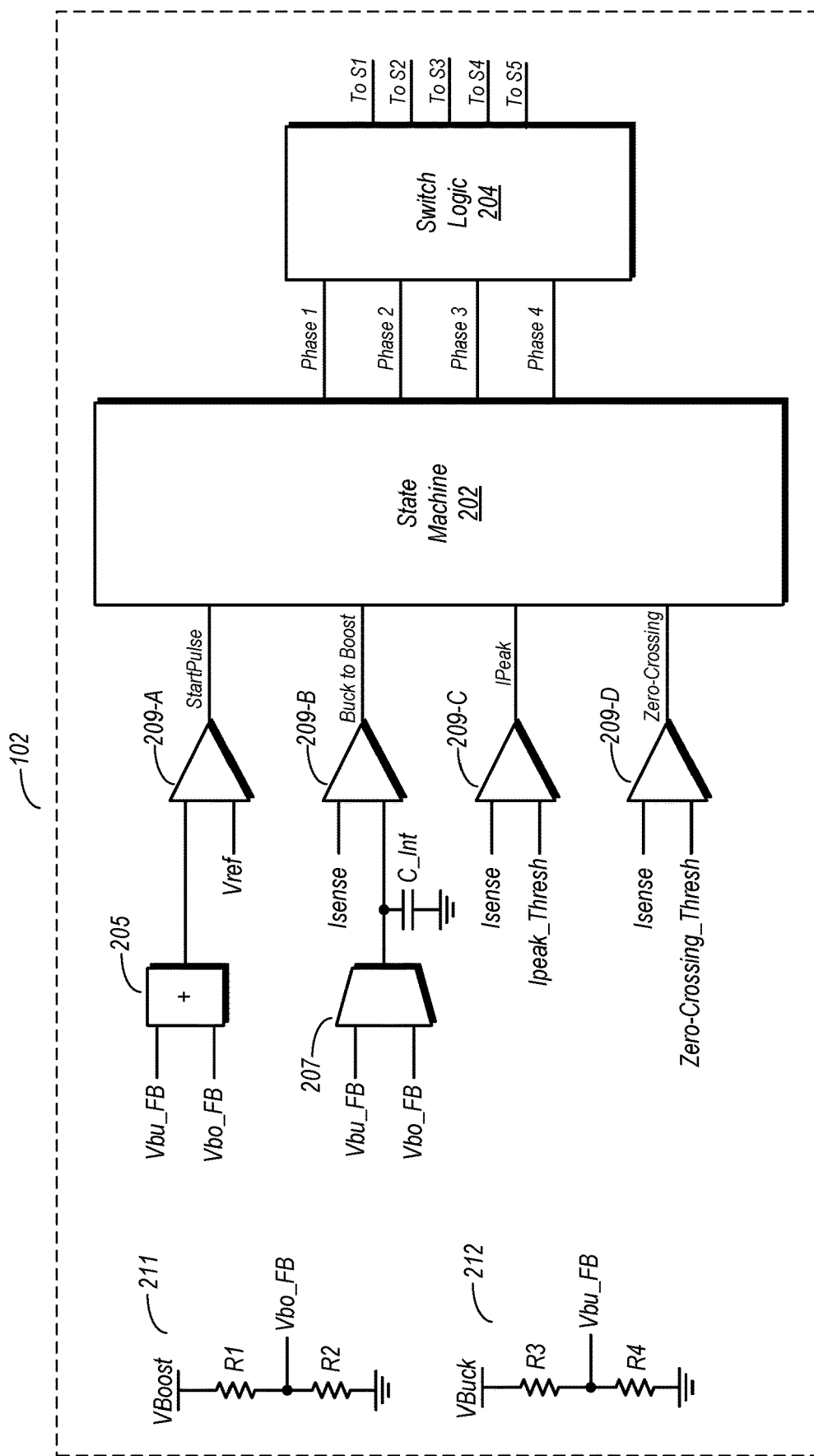
FIG. 2 is a diagram illustrating one embodiment of a control circuit used in a DC-DC converter embodiment.

In the embodiment shown in FIG. 2, control circuit 102 includes a state machine 202 which is configured to generate phase signals, Phase 1-Phase 4 in accordance with the inputs thereto. One of the phase signals may be asserted at a given time while the others remain de-asserted. Switch logic 204 translates these phases into switching signals for switches S1-S5. For a given phase, one or more of these switches may be closed, while the remainder of the switches are open. The particular switch configurations for the various phases of one embodiment are discussed in further detail below with reference to FIG. 3.

In the embodiment shown, feedback voltages are generated based on the boost and buck voltages output from H-bridge circuit 110. Voltage divider 211, which includes resistors R1 and R2, generates a first feedback voltage Vbo_FB, based on received voltage VBoost. Voltage divider 212, which includes resistors R3 and R4, generates a second feedback voltage, Vbu_FB, based on received voltage VBuck. Both of the voltage divider circuit are arranged to produce the feedback voltages at the same proportion relative to their respective input voltages. For example, if Vbo_FB is produced at one half the value of VBoost, Vbu_FB is also produced at one half the value of VBuck.

Control circuit 102 in the embodiment shown further includes a number of comparators, 209-A-209-D. Comparator 209-A is coupled to receive, on one input, a reference voltage Vref. This voltage may be generated by, e.g., a bandgap circuit or other reference voltage generating circuit within control circuit 102 or from another circuit external thereto. The other input to comparator 209-A is an average of feedback voltages Vbu_FB and Vbo_FB, which is generated by averaging circuit 205, and which corresponds to the average of the buck and boost output voltages (VBuck and VBoost). The output of comparator 209-A is a signal StartPulse, which causes state machine to assert the Phase 1 output signal, thereby beginning the first phase of the current pulse through inductor L1 of H-bridge circuit 110.

Comparator 209-B in the embodiment shown is configured to receive, on one input, an integrated error signal generated by integrator 207 in conjunction with capacitor C_int (which is not necessarily present in all embodiments). The error signal output form integrator 207 is generated based on a differential between the feedback voltages. The other input to comparator 209 is a signal Isense. During the first phase, the buck charging phase (the various phases are discussed in further detail below), Isense may be a voltage corresponding to a current through switch S3 of H-bridge circuit 110. The output of comparator 209-B is a signal Buck to Boost, which, when asserted, indicates that the current through S3 has reached the buck-to-boost threshold and marks the end of the first phase of the current pulse and causes state machine 202 to de-assert the Phase 1 signal and assert the Phase 2 signal, thereby causing the second phase of the current pulse to commence. During the third phase, the boost discharge phase, Isense may be a voltage corresponding to a current through switch S1. When the inductor current has sufficiently discharged, comparator 209-B may de-assert the Buck to Boost signal, thereby causing state machine 202 de-assert the Phase 3 signal and asserts the Phase 4 signal.

Comparator 209-C in the embodiment shown includes a first input coupled to receive a voltage Isense corresponding to a current through switch S1 during operation in the second phase (referred to as the boost charging phase). The other input to comparator 209-C is an input voltage Ipeak_Thresh. When the current through inductor L1, as indicated by Isense, reaches a peak value corresponding to the threshold value Ipeak_Thresh, comparator 209-C asserts the Ipeak signal. Responsive to assertion of the Ipeak signal, state machine 202 de-asserts the Phase 2 signal and asserts the Phase 3 signal.

Comparators 209-D in the embodiment shown is coupled to receive a Zero-Crossing threshold signal on one input, and a voltage Isense corresponding to a current through switch S5 during the fourth phase of operation. The voltage Isense input into comparator 209-D may fall as the current through S5 falls. When the Zero-Crossing threshold is reached, the Zero-Crossing output signal is asserted, causing state machine 202 to de-assert the Phase 4 signal. This marks the end of the four phases of the current pulse. The next current pulse may begin when comparator 209-A once again asserts the StartPulse signal.

Figure 3:
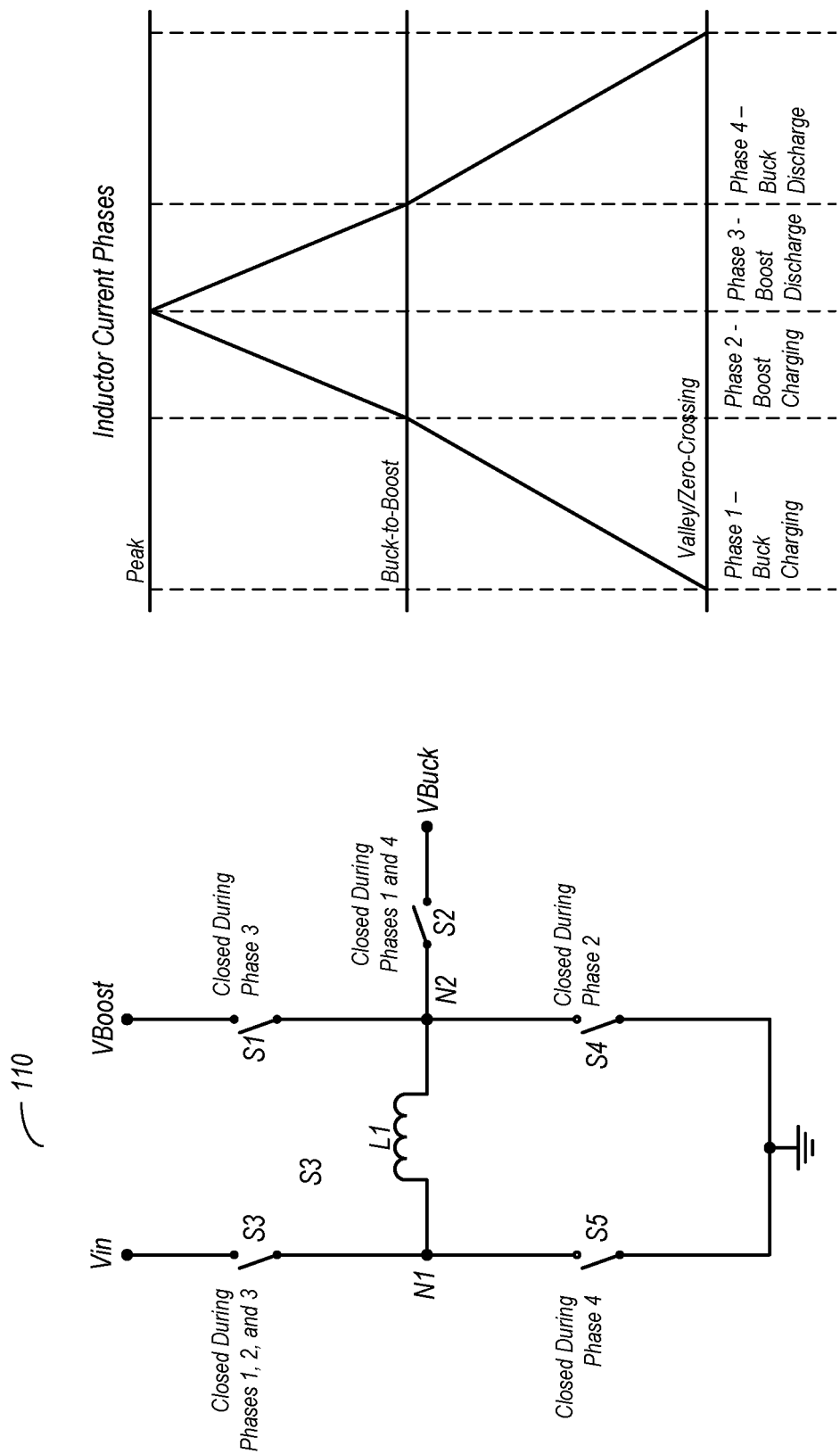
FIG. 3 is a diagram illustrating one embodiment of an H-bridge circuit and the corresponding phases of operation in a DC-DC converter in terms of an inductor current pulse.

FIG. 3 is a diagram illustrating one embodiment of H-bridge circuit 110 and the corresponding phases of operation in the DC-DC converter disclosed herein, in terms of a single instance of an inductor current pulse. As previously noted, H-bridge circuit includes switches S1-S5. All switches are open when not otherwise indicated as closed. Switch S3, which is coupled between Vin and node N1, is closed during Phases 1, 2, and 3, which are the buck charging phase, the boost charging phase, and the boost discharge phase, respectively. Switch S2, coupled between node N2 and Vbuck, is closed during Phase 1 and Phase 4, the buck charging and buck discharging phases, respectively. Switch S1, coupled between VBoost and node N2 is closed during Phase 3. Switch S4, coupled between node N2 and ground, is closed during Phase 2. Finally, switch S5, coupled between node N1 and ground, is closed during Phase 4.

During Phase 1, switches S2 and S3 are closed. This creates a current path between the Vin and VBuck nodes. This phase is referred to here as the buck charging phase. When switches S2 and S3 are closed, a current path exists from Vin to VBuck, through inductor L1. As the current through inductor L1 increases, an opposing voltage is developed. This voltage is transferred to VBuck as long as switch S2 remains closed. Phase 1 continues until the inductor current reaches the buck-to-boost threshold as shown in the graph of the current pulse. Upon reaching the buck-to-boost threshold, Phase 1 completes and control circuit 102 a transition of H-bridge circuit 110 from Phase 1 to Phase 2.

In transitioning to Phase 2, switch S2 is opened and switch S4 is closed, while switch S3 remains closed. This phase is referred to here as the boost charging phase. In this phase, a current path exists between Vin and ground, through inductor L1. Due to the greater difference in potential Vin to ground relative to Vin to VBuck, the current through L1 continues to increase and the inductor thus stores even more energy than in the buck charging phase. The boost charging phase continues until the inductor current reaches its peak value. Upon reaching the peak value, control circuit 102 transitions H-bridge circuit 110 from Phase 2 to Phase 3.

Phase 3 is referred to here as the boost discharge phase. In transitioning to the boost discharge phase, switch S4 is opened and switch S1 is closed. This creates a current path between Vin and VBoost, through inductor L1. The energy accumulated in inductor L1 during the boost charging phase is now transferred to VBoost as a result of the closing of switch S1. Furthermore, the direction of current flow reverses due to the potential on VBoost being greater than that of Vin. Inductor L1 now discharges current to Vin. When the inductor current falls to the buck-to-boost level, as shown in the graph of the current pulse, the boost discharging phase is complete, and control circuit 102 then transitions H-bridge circuit 110 to Phase 4.

In transitioning to Phase 4, referred to here as the buck discharge phase, both switches S1 and S3 are opened, while switches S2 and S5 are closed. This results in a current path between VBuck and ground, through inductor L1. Energy in the inductor is now discharged from VBuck, through L1, to ground. When the current through L1 falls to the valley/zero-crossing level, Phase 4 is complete. Switches S2 and S5 may then be opened. Thereafter, when the conditions to start the pulse again are realized, control circuit 102 may transition H-bridge circuit to Phase 1 to repeat the cycle.

Figure 4:
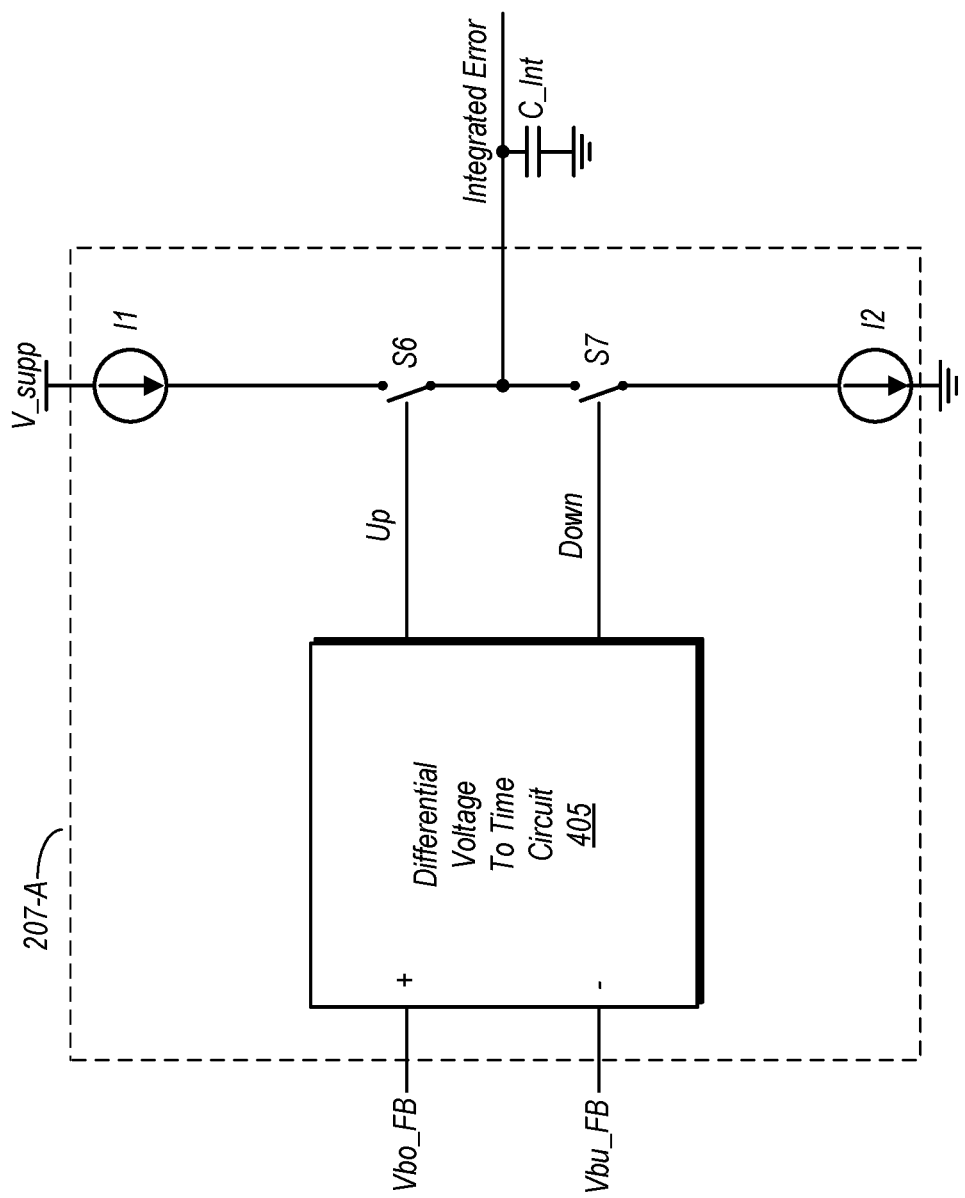
FIG. 4 is an example of an integrator in a differential control loop for one embodiment of a DC-DC converter.

FIG. 4 is an example of an integrator in a differential control loop for one embodiment of a DC-DC converter. In particular, FIG. 4 illustrates an analog embodiment of integrator 207 (numbered here as 207-A), which, with capacitor C_Int performs an integration function based on a differential between the boost and buck voltages, as reflected in the levels of the feedback signals Vbo_FB and Vbu_FB. This circuit is used in determining when the buck-to-boost level is reached as a trigger to transfer from the buck charging phase to the boost charging phase, as well as a trigger to transfer from the boost discharge phase to the buck discharge phase. The output signal provided on the Integrated Error node is provided to a corresponding input of comparator 209-B as shown in FIG. 2.

In the embodiment shown, integrator 207-A includes a differential voltage to time circuit 405, which is shown here as receiving feedback voltages Vbo_FB and Vbu_FB. An embodiment of a differential voltage to time circuit is discussed in further detail below with reference to FIG. 6. When Vbo_FB is greater than Vbu_FB, differential voltage to time circuit 405 outputs an up signal, causing switch S6 to close (while switch S7 is open). The up signal is a pulse whose duration is proportional to the difference between Vbo_FB and Vbu_FB. While the up signal is asserted, current from current source I1 (which is coupled to a supply voltage node V_supp) flows through switch S6 onto the Integrated Error node. Capacitor C_Int is charged as a result of this current, and the output on this node is the integrated error between the two feedback voltages (and thus, between VBuck and VBoost).

When Vbo_FB is less than Vbu_FB, differential voltage to time circuit 405 outputs the down signal as a pulse, thereby closing switch S7 while switch S6 is open. Current source I2 then draws current from Integrated Error node. Capacitor C_int may discharge to ground through current source I2 and switch S7. As with the pulse of the up signal described in the previous paragraph, the down signal pulse has a duration that is proportional to the difference between Vbu_FB and Vbo_FB.

Figure 5:
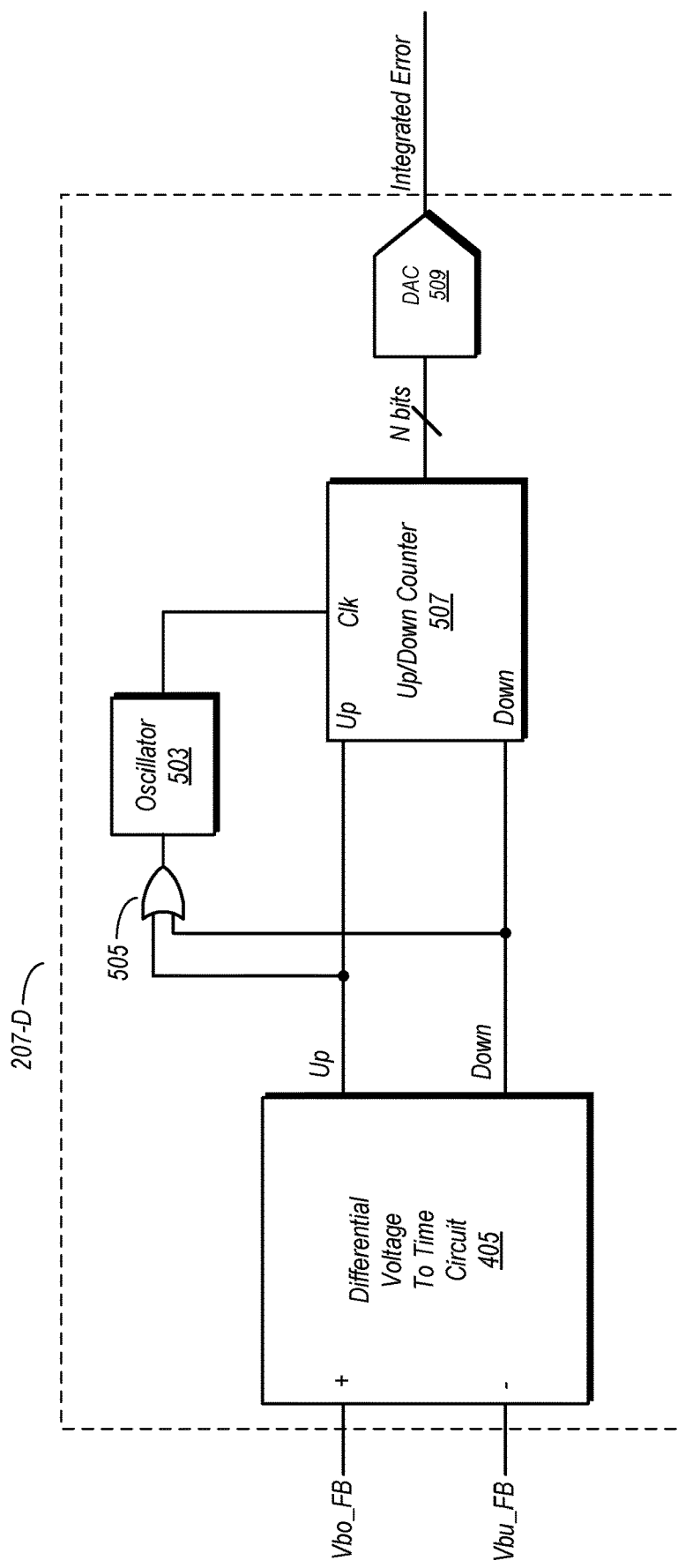
FIG. 5 is another example of an integrator in a differential control loop for one embodiment of a DC-DC converter.

FIG. 5 is a diagram of another embodiment of the integrator. In this embodiment, integrator 207-D is implemented digitally. Differential voltage to time circuit 405 in this embodiment functions largely the same as that of the embodiment shown in FIG. 4. When either one of the up or down signals is asserted, OR gate 505 outputs a logic high to oscillator 503, which causes the production of a clock signal. Oscillator 503 may, in one embodiment, be a ring oscillator, although any suitable clock generation circuitry may be used.

In addition to being provided to OR gate 505, an asserted up or down signal is also provided to Up/Down counter 507. This determines the direction of the count, up or down (incremented or decremented) when the clock signal is received on the clock input ('Clk'). Accordingly, Up/Down counter 507 produces a corresponding count value of N bits based on both the duration of the pulse and the direction of the count as determined by whether the Up signal pulse or Down signal pulse is provided. This N bit value is provided to digital to analog converter (DAC) 509, which provides a corresponding analog signal on the Integrated Error output that is provided to the corresponding input of comparator 209-B as shown in FIG. 2.

Figure 6:
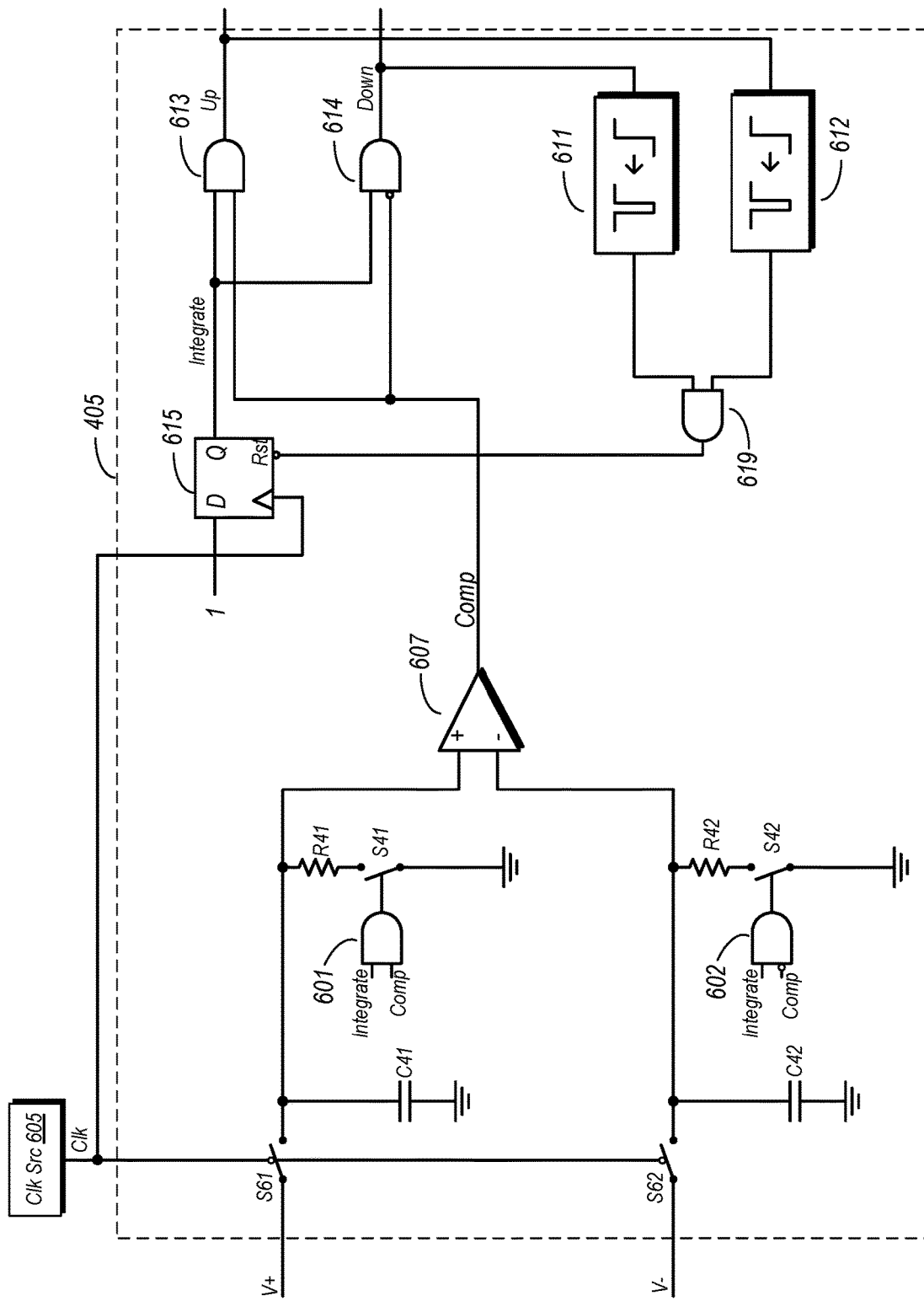
FIG. 6 is an example of a differential voltage-to-time circuit used in an integrator in an embodiment of a DC-DC converter.

FIG. 6 is a diagram of one embodiment of differential voltage to time circuit 405 that is used in the embodiments of the integrator shown in FIGS. 4 and 5. In the embodiment shown, the circuit includes two inputs. V+ and V− (which may, e.g., receive the Vbo_FB and Vbu_FB voltages, respectively). The received voltages may be sample in accordance with a clock signal ('Clk6') that is produce by clock source 605 and provided to switches S61 and S62. Switches S61 and S62 may be implemented as any suitable device, such as a MOSFET, a passgate comprising multiple MOSFETs, and so on. The circuit shown here also includes capacitors C41 and C42, resistors R41 and R42, and additional switches S41 and S42. Capacitors C41 and C42 may charge responsive to a sampled voltage on their respective inputs. The amount of charge on these pulses may determine the duration of the correspondingly produced Up or Down pulses.

The sample input voltages conveyed via switches S61 and S62 are received on the non-inverting and inverting inputs, respectively, of comparator 607. If the sampled voltage on the V+ input is greater than that of the sampled voltage on the V− input, the comparator output signal, Comp, is equivalent to a logic high voltage. If the sampled voltage on the V− input is greater than that of the sampled voltage on the V+ input, the output signal Comp is equivalent to a logic low voltage.

AND gates 613 and 614 each include one input coupled to receive the Comp output from comparator 607. AND gate 613 is responsive to a logic high value of Comp, while AND gate 614 (as indicated by the bubble) is responsive to a logic low value of Comp. The other input on each of these AND gates is the Integrate signal, which is output from flip-flop 615. In the embodiment shown, flip-flop 615 is a D-type flip-flop having its D input hardwired to receive a logic one (e.g., logic high voltage in this case). Assuming that flip-flop 615 is not in a reset state, the Q output therefrom is thus a logic one. Accordingly, one of AND gates 613 or 614 will assert the Up or Down signal, respectively, depending on the state of the Comp signal when flip-flop 615 is not in a reset state. When Comp is high and flip-flop 615 is not in a reset state, AND gate 613 asserts the Up signal. When Comp is low and flip-flop 615 is not in a reset state, AND gate 614 asserts the Down signal.

As noted above, the Up and Down signals are asserted as pulsed of a finite duration. This duration may be determined by the difference between the input voltages and the circuitry coupled to the input lines. AND gate 601 in the embodiment is coupled to receive the same inputs at AND gate 613, while AND gate 602 in the embodiment shown is arranged similarly to AND gate 614 (and is thus responsive Comp in a logic low state). When Integrate and Comp are both high, AND gate 601 outputs a logic high that closes switch S41. When S41 is closed, a discharge path is created between the high side terminal of C41 and ground, through resistor R41 and switch S41. Accordingly, the sampled voltage on V+ will fall until the state until the Comp signal changes states from high to low. When the Comp signal falls low, AND gate 601 will de-assert its output signal, thereby causing S41 to open. The amount of time for the discharge to occur will determine the duration of the Up pulse.

When Integrate is at a logic high voltage and Comp is at a logic low voltage, AND gate 602 will cause switch S42 to close. This provides a discharge path from the high side terminal of C42, through resistor R42 and switch S42, to ground. When the sampled voltage V− falls low enough, the Comp signal will transition from a logic low to a logic high. Responsive to this transition, AND gate 602 will de-assert its output signal, thereby opening switch S42. As with the Up pulse, the duration of the Down pulse is determined by the amount of time for C42 to discharge through the corresponding circuit path created when S42 is closed.

A transition of either of the Up or Down signals from logic high to logic low will cause a reset of flip-flop 615 in the illustrated embodiment. Voltage to time circuit 405 in the embodiment shown includes two pulse generating circuits 611 and 612. These circuits normally (e.g., when one of the Up or Down signals is high) logic high voltages, which causes AND gate to assert a logic high to the active low reset input ('Rst') of flip-flop 615. However, when either of the Up or Down signals falls low, the correspondingly coupled one of pulse generating circuit 611 and 612 briefly outputs a low-going pulse. This low-going pulse, when received at the reset input of flip-flop 615, de-asserts the Integrate signal to a logic low voltage. After the reset input is driven high again by AND gate 619, the Integrate signal may be asserted again upon flip-flop 615 receiving the next positive edge of the clock signal from clock source 605.

Figure 7:
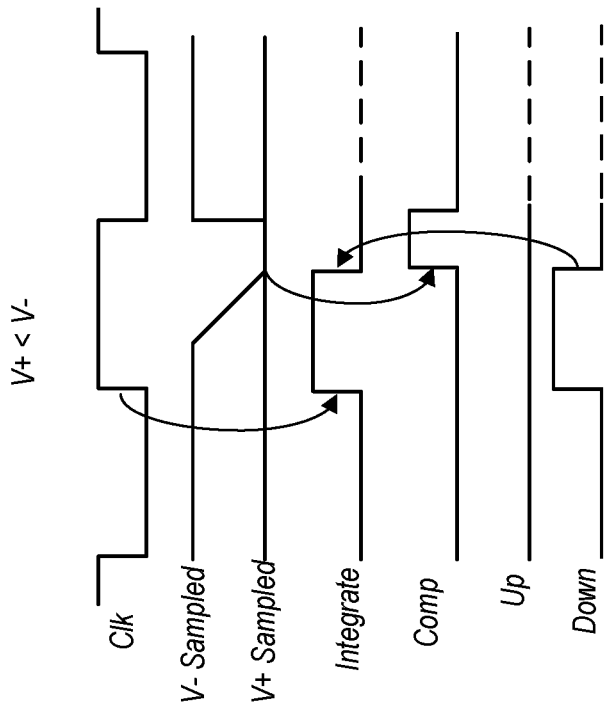
FIG. 7 illustrates timing relationships for one embodiment of a differential voltage-to-time circuit used in an embodiment of a DC-DC converter.
Figure 7:
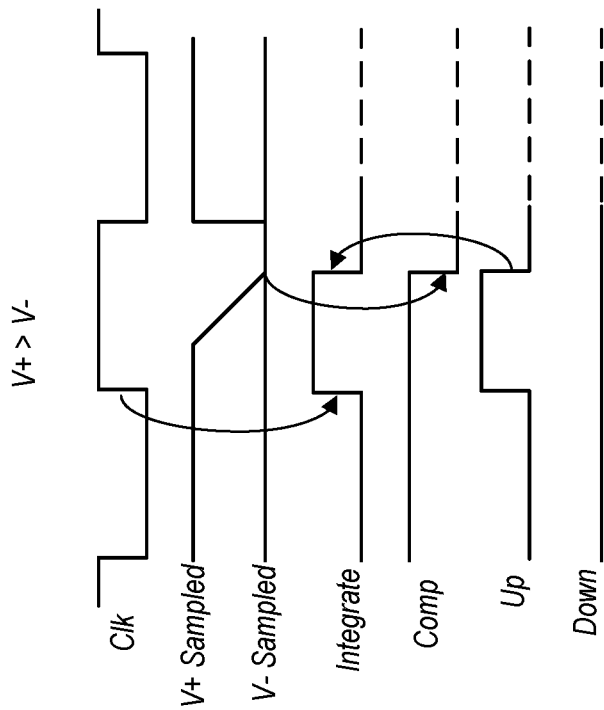

The operation of voltage to time circuit 405 is further illustrated in the timing diagrams shown in FIG. 7. The left-hand timing diagram illustrates the operation when the voltage on the V+ input is greater than that of the V− input, as shown (e.g., V+ Sampled is greater than V− Sampled). Responsive to the positive going edge of the clock signal, Clk, the Integrate signal is asserted. The assertion of the Integrate signal with Comp at a logic high results in assertion of the Up pulse. Meanwhile, the voltage on V+, V+ Sampled, begins falling due to the discharge path created by the closing of switch S41, as described above with reference to FIG. 6. When have fallen to at least the level of V− Sample, the Comp signal responds by falling from a logic high to a logic low. When Comp falls to a logic low, the Up pulse follows, also falling to a logic low. The falling of the Up pulse from a logic high to a logic low results in a reset of flip-flop 615, thereby causing de-assertion of the Integrate signal.

When voltage on the V− input is greater than that on the V+ input, operation occurs as follows. After the reset of the flip-flop circuit, the Integrate signal is low until the next rising edge of the clock signal, Clk. Meanwhile, in the example shown, the Comp signal is low. When the Integrate signal transitions high while the clock signal is low, the Down signal is asserted in response. Thereafter, the V− Sampled voltage begins discharging as described above in reference to FIG. 6. After discharging to a level of at least the V+ Sampled voltage, the Comp signal transitions from low to high. The low to high transition of the Comp signal causes the Down signal to fall low, which resets the flip-flop and thereby causes the Integrate signal to fall low.

Figure 8:
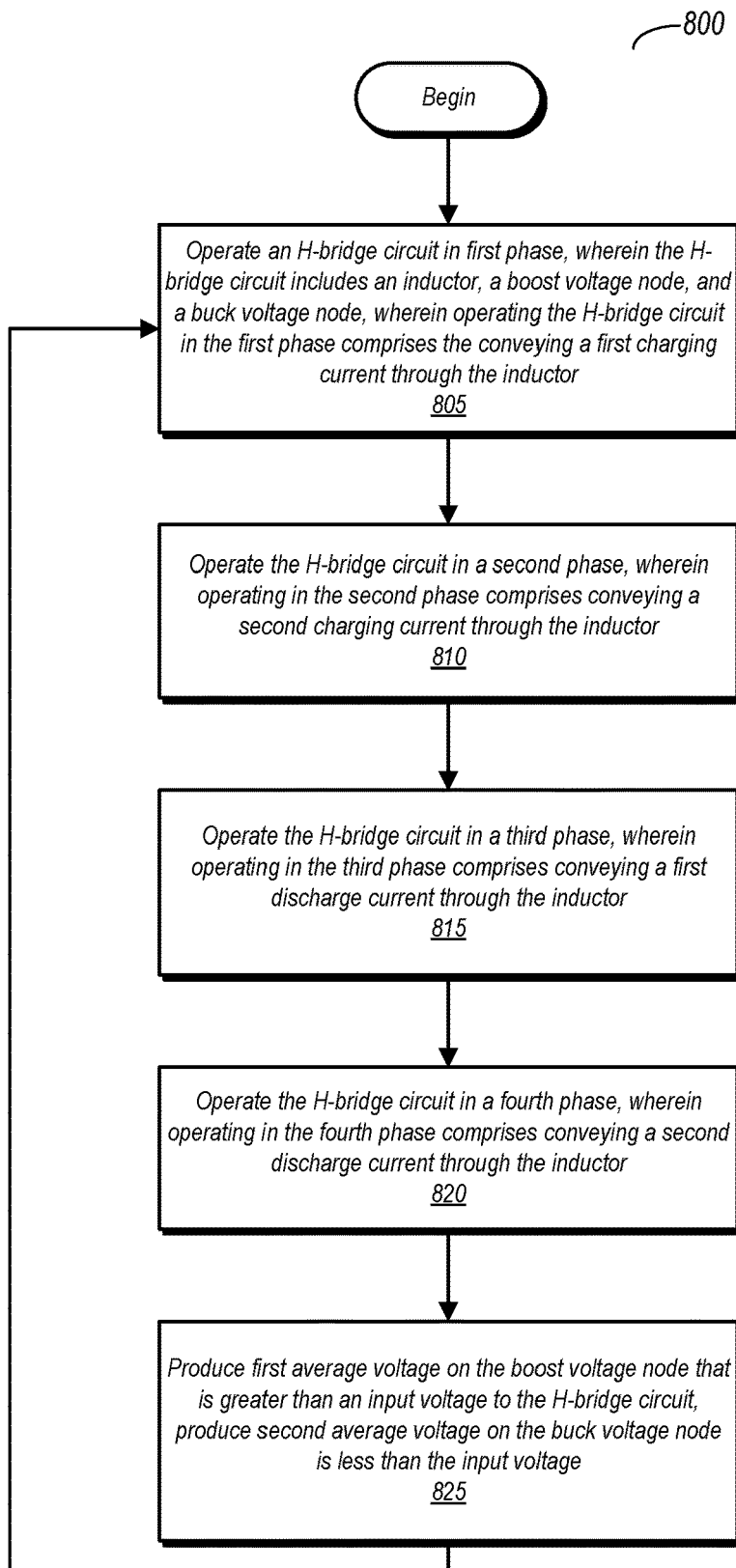
FIG. 8 is a flow diagram illustrating one embodiment of a method for operating a DC-DC converter arranged to provide both buck and boost voltages.

FIG. 8 is a flow diagram of one embodiment of a method for operating a DC-DC converter capable of producing both buck and boost voltages utilizing a single inductor. The method may be performed using various embodiments of the DC-DC converter discussed in the figures previously discussed. Embodiments of a DC-DC converter capable of producing both buck and boost voltages utilizing a single inductor may also carry out Method 800, and may thus fall within the scope of this disclosure.

Method 800 involves operating a DC-DC converter in repeated cycles each having four different phases. Method 800 includes operating an H-bridge circuit in a first phase, wherein the H-bridge circuit includes an inductor, a boost voltage node, and a buck voltage node, wherein operating the H-bridge circuit in the first phase comprises the conveying of a first charging current through the inductor (block 805). Method 800 continues with the operating of the H-bridge circuit in a second phase, wherein operating in the second phase comprises conveying a second charging current through the inductor (block 810). The method further includes operating the H-bridge circuit in a third phase, wherein operating in the third phase comprises conveying a first discharge current through the inductor (block 815). The cycle completes with operating the H-bridge circuit in a fourth phase, wherein operating in the fourth phase comprises a conveying a second discharge current through the inductor (block 820). Method 800 continues by repeating operation of the H-bridge in the first, second third and fourth phases such that a first average voltage produced on the boost voltage node is greater than an input voltage to the H-bridge circuit, and a second average voltage produced on the buck voltage node is less than the input voltage (block 825).

In various embodiments, operating the H-bridge circuit in the first, second, third, and fourth phases includes a control circuit controlling a plurality of switches implemented in the H-bridge circuit. The plurality of switches includes a first switch coupled between a first terminal of the inductor and the boost voltage node, a second switch coupled between the first terminal of the inductor and the buck voltage node, and a third switch coupled between a second terminal of the inductor and an input voltage node.

In various embodiments, the method may include generating first and second feedback voltages used by the control circuit, wherein the first feedback voltage is based on the boost voltage and the second feedback voltage is based on the buck voltage. The method may further include a state machine of the control circuit controlling the plurality switches based on an inductor current, the first and second feedback voltages, and a plurality of threshold voltages.

Figure 9:
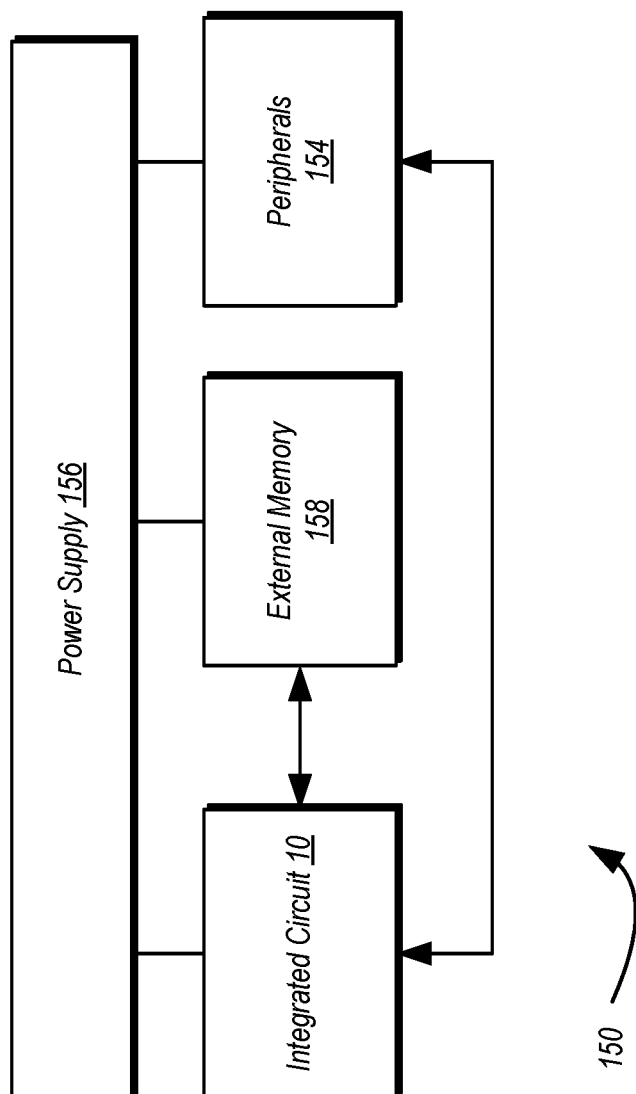
FIG. 9 is a block diagram of one embodiment of an example system.

Turning next to FIG. 9, a block diagram of one embodiment of a system 150 is shown. In the illustrated embodiment, the system 150 includes at least one instance of an integrated circuit 10 coupled to external memory 158. The integrated circuit 10 may include a memory controller that is coupled to the external memory 158. The integrated circuit 10 is coupled to one or more peripherals 154 and the external memory 158. A power supply 156 is also provided which supplies the supply voltages to the integrated circuit 10 as well as one or more supply voltages to the memory 158 and/or the peripherals 154. In some embodiments, more than one instance of the integrated circuit 10 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as Wi-Fi, Bluetooth, cellular, global positioning system, etc. The peripherals 154 may also include additional storage, including RAM storage, solid-state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, tablet, etc.).

In various embodiments, integrated circuit 10 and/or peripherals 154 may include implementations of the DC-DC converter discussed above. Accordingly, integrated circuit 10 and/or the peripherals 154 may include at least two different power domains, one of which utilizes the supply voltage produced on the buck node (VBuck) while another power domain utilizes the supply voltage produced on the boost node (VBoost).

The external memory 158 may include any type of memory. For example, the external memory 158 may be SRAM, dynamic RAM (DRAM) such as synchronous DRAM (SDRAM), double data rate (DDR, DDR2, DDR3, LPDDR1, LPDDR2, etc.) SDRAM, RAMBUS DRAM, etc. The external memory 158 may include one or more memory modules to which the memory devices are mounted, such as single inline memory modules (SIMMs), dual inline memory modules (DIMMs), etc.

Numerous variations and modifications will become apparent to those skilled in the art once the above disclosure is fully appreciated. It is intended that the following claims be interpreted to embrace all such variations and modifications.

What is claimed is:

1. A circuit comprising:
   an H-bridge circuit including:
      an inductor having a first terminal coupled to a first node and a second terminal coupled to a second node; and
      a plurality of switches including a first switch coupled between the second node and a boost voltage node, and a second switch coupled between the second node and a buck voltage node; and
   a control circuit configured to activate the plurality of switches in accordance with a plurality of phases in a repeating cycle such that a first voltage is provided on the buck voltage node during a first subset of the plurality of phases, and a second voltage is provided on the boost voltage node during a second subset of the plurality of phases, wherein the first voltage is less than an input voltage provided on an input voltage node and wherein the second voltage is greater than the input voltage.

2. The circuit of claim 1, wherein the plurality of switches further includes:
   a third switch coupled between the input voltage node and the first node;
   a fourth switch coupled between the first node and a ground node; and
   a fifth switch coupled between the second node and the ground node.

3. The circuit of claim 1, wherein the control circuit is configured to wherein the control circuit comprises a state machine configured to activate the plurality of switches in accordance with the plurality of phases based at least in part on a first feedback voltage based on the first voltage, and a second feedback voltage based on the second voltage.

4. The circuit of claim 3, wherein the control circuit includes a plurality of comparators each coupled to provide a corresponding one of a plurality of output signals to the state machine.

5. The circuit of claim 4, wherein a first one of the plurality of comparators is configured to compare an average of the first and second feedback voltages to a reference voltage and generate a first output signal, wherein the state machine is configured set the plurality of switches to operate the H-bridge circuit as a buck converter in accordance with a first one of the plurality of phases.

6. The circuit of claim 4, wherein a second one of the plurality of comparators is configured to change a state of a second signal based on a first voltage threshold, wherein the state machine is configured to cause the H-bridge to transition from a first phase to a second phase of the plurality of phases responsive to a first change of state of the second output signal, and further configured to cause the H-bridge to transition from a third phase to a fourth phase of a plurality of phases responsive to a second change of state of the second output signal.

7. The circuit of claim 4, wherein a third one of the plurality of comparators is configured to assert a third output signal response to an output current through the inductor reaching a peak threshold, wherein the state machine is configured to cause the H-bridge circuit to transition from a second phase to a third phase of the plurality of phases responsive to assertion of the third output signal.

8. The circuit of claim 4, wherein a fourth one of the plurality of comparators is configured to assert a fourth output signal responsive to an output current through the inductor reaching a zero crossing threshold, wherein the state machine is configured to cause the H-bridge circuit to transition from a fourth phase to a first phase of the plurality of phases responsive to assertion of the fourth output signal.

9. The circuit of claim 1, wherein the plurality of phases includes first, second, third and fourth phases, wherein the first subset of phases includes the first and fourth phases, and wherein the second subset of phases includes the second and third phases.

10. The circuit of claim 9, wherein:
the first phase comprises the inductor charging to a first value to convey the first voltage on the buck voltage node;
the second phase comprises the inductor charging to a second value to convey the second voltage on the boost voltage node;
the third phase comprises the inductor discharging the boost voltage from the boost voltage node; and
the fourth phase comprises the inductor discharging the buck voltage from the buck voltage node.

11. A method comprising:
operating an H-bridge circuit in a first phase, wherein the H-bridge circuit includes an inductor, a boost voltage node, and a buck voltage node, wherein operating the H-bridge circuit in the first phase comprises conveying a first charging current through the inductor;
operating the H-bridge circuit in a second phase, wherein operating in the second phase comprises conveying a second charging current through the inductor;
operating the H-bridge circuit in a third phase, wherein operating in the third phase comprises conveying a first discharge current through the inductor;
operating the H-bridge circuit in a fourth phase, wherein operating in the fourth phase comprises a conveying a second discharge current through the inductor; and
repeating operating the H-bridge in the first, second third and fourth phases such that a first average voltage produced on the boost voltage node is greater than an input voltage to the H-bridge circuit, and a second average voltage produced on the buck voltage node is less than the input voltage.

12. The method of claim 11, wherein operating the H-bridge circuit in the first, second, third, and fourth phases includes a control circuit controlling a plurality of switches implemented in the H-bridge circuit, the plurality of switches including:
a first switch coupled between a first terminal of the inductor and the boost voltage node;
a second switch coupled between the first terminal of the inductor and the buck voltage node; and
a third switch coupled between a second terminal of the inductor and an input voltage node.

13. The method of claim 12, further comprising generating first and second feedback voltages used by the control circuit, wherein the first feedback voltage is based on the boost voltage and the second feedback voltage is based on the buck voltage.

14. The method of claim 13, further comprising a state machine of the control circuit controlling the plurality switches based on an inductor current, the first and second feedback voltages, and a plurality of threshold voltages.

15. A circuit comprising:
an inductor having a first terminal coupled to a first node and a second terminal coupled to a second node; and
a plurality of switches including a first switch coupled between the second node and a boost voltage node, a second switch coupled between the second node and a buck voltage node, and a third switch coupled between an input voltage node and the first node; and
a control circuit configured to control each of the plurality of switches in accordance with a plurality of phases to cause a first voltage to be provided on the buck voltage node during a first subset of the plurality of phases and a second voltage to be provided on the boost voltage node during a second subset of the plurality of phases, wherein the first voltage is less than the input voltage and the second voltage greater than the input voltage.

16. The circuit of claim 15, wherein the plurality of phases includes first, second, third and fourth phases, wherein the first subset includes the first and fourth phases, wherein the second subset includes the second and third phases, and wherein the control circuit is configured to cause cycling through the first through fourth phases in a repeating cycle.

17. The circuit of claim 16, wherein:
the first phase comprises charging the inductor to a first value in accordance with the first voltage;
the second phase comprises charging the inductor to a second value in accordance with the second voltage;
the third phase comprises discharging the second voltage from the boost voltage node; and
the fourth phase comprises discharging the first voltage from the buck voltage node.

18. The circuit as recited in claim 15, further comprising providing a first and second feedback voltages, based on the first and second voltages, respectively, to the control circuit, wherein the control circuit is configured to implement a first control loop based on an average of the first and second feedback voltages, and a second control loop based on a differential between the first and second feedback voltages.

19. The circuit of claim 15, wherein the control circuit is configured to:
close the third switch during first, second and third phases of the plurality of phases and open the third switch during a fourth phase of the plurality of phases;
close the first switch during the third phase and open the first switch during the first, second and fourth phases; and
close the second switch during first and fourth phases and open the second switch during the second and third phases.

20. The circuit of claim 19, further comprising a fourth switch coupled between the first node and a ground node, and a fifth switch coupled between the second node and a ground node, wherein the control circuit is further configured to:
close the fourth switch during the fourth phase and open the fourth switch during the first, second and third phases; and close the fifth switch during the second phase, and open the fifth switch during the first, third and fourth phases.

* * * * *